United States Patent
Lee et al.

(10) Patent No.: US 11,888,653 B2
(45) Date of Patent: *Jan. 30, 2024

(54) MANAGING NETWORK PACKET FLOWS BASED ON DEVICE INFORMATION

(71) Applicant: Comcast Cable Communications, LLC, Philadelphia, PA (US)

(72) Inventors: Yiu Leung Lee, Philadelphia, PA (US); Charles Allen Helfinstine, Wynnewood, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,142

(22) Filed: Aug. 10, 2022

(65) Prior Publication Data

US 2023/0075191 A1 Mar. 9, 2023

Related U.S. Application Data

(63) Continuation of application No. 16/995,066, filed on Aug. 17, 2020, now Pat. No. 11,463,281, which is a continuation of application No. 16/265,562, filed on Feb. 1, 2019, now Pat. No. 10,785,058.

(51) Int. Cl.
| | |
|---|---|
| *H04L 12/54* | (2022.01) |
| *H04L 12/66* | (2006.01) |
| *H04L 67/02* | (2022.01) |
| *H04L 67/303* | (2022.01) |
| *H04L 61/5007* | (2022.01) |
| *H04L 101/622* | (2022.01) |

(52) U.S. Cl.
CPC .......... *H04L 12/66* (2013.01); *H04L 61/5007* (2022.05); *H04L 67/02* (2013.01); *H04L 67/303* (2013.01); *H04L 2101/622* (2022.05)

(58) Field of Classification Search
CPC ..... H04L 12/66; H04L 61/5007; H04L 67/02; H04L 67/303; H04L 2101/622; H04L 45/033; H04L 61/4511; H04L 61/5014
USPC .......... 370/401–408; 709/227–229, 238, 249
See application file for complete search history.

(56) References Cited

U.S. PATENT DOCUMENTS

| | | | |
|---|---|---|---|
| 6,771,757 B1 * | 8/2004 | Torkki | H04Q 3/0029 |
| | | | 379/142.09 |
| 6,901,378 B1 | 5/2005 | Linker et al. | |
| 7,240,364 B1 | 7/2007 | Branscomb et al. | |
| 7,774,464 B2 | 8/2010 | Vuori et al. | |

(Continued)

FOREIGN PATENT DOCUMENTS

| | | | | |
|---|---|---|---|---|
| CA | 3051705 A1 * | 2/2019 | | G01R 31/44 |
| CA | 2991833 C  * | 6/2020 | | H04L 9/0894 |

(Continued)

OTHER PUBLICATIONS

US Patent Application filed on Aug. 17, 2020, entitled "Managing Network Packet Flows Based On Device Information", U.S. Appl. No. 16/995,066.

*Primary Examiner* — Thai D Hoang
(74) *Attorney, Agent, or Firm* — BakerHostetler

(57) ABSTRACT

Methods and apparatus are disclosed that enable information about devices connected behind a gateway, such as a home gateway, to be made available to and used by other entities, such as servers and routers, on a communications network.

27 Claims, 7 Drawing Sheets

(56) References Cited

U.S. PATENT DOCUMENTS

| | | |
|---|---|---|
| 8,131,837 B1 | 3/2012 | Nayfeh |
| 8,997,176 B1 | 3/2015 | Znidarsic et al. |
| 10,088,818 B1 * | 10/2018 | Mathews ............... G05B 15/02 |
| 10,123,232 B2 | 11/2018 | Mishra et al. |
| 10,523,546 B1 | 12/2019 | Kavanagh et al. |
| 10,785,058 B2 | 9/2020 | Lee et al. |
| 2001/0024425 A1 | 9/2001 | Tsunoda et al. |
| 2004/0002896 A1 | 1/2004 | Alanen et al. |
| 2005/0202392 A1 | 9/2005 | Allen et al. |
| 2006/0239254 A1 | 10/2006 | Short et al. |
| 2008/0261191 A1 | 10/2008 | Woolf et al. |
| 2009/0281902 A1 | 11/2009 | McNamara |
| 2010/0138370 A1 | 6/2010 | Wu et al. |
| 2016/0352729 A1 | 12/2016 | Malik |
| 2017/0039584 A1 | 2/2017 | Slavin et al. |
| 2017/0270130 A1 | 9/2017 | Sadovsky |
| 2020/0010880 A1 | 1/2020 | Ku et al. |
| 2020/0097731 A1 | 3/2020 | Gupta et al. |

FOREIGN PATENT DOCUMENTS

| | | | | |
|---|---|---|---|---|
| WO | WO-0135269 A2 * | 5/2001 | ....... | G06F 17/30607 |
| WO | WO-2004100492 A1 * | 11/2004 | ....... | H04L 29/06027 |

* cited by examiner

| Device-ID | Device Profile | Gateway ID | Existing Flows by Flow ID | Policies |
|---|---|---|---|---|
| 64-bit random id | IPv4-Addr<br>IPv6-Addr<br>Device mac-address<br>Hostname<br>Top 5 Frequent DNS Queries<br>Device Info in Http Header | 24-bit id | 64-bit FlowId-A<br>64-bit FlowId-B<br>64-bit FlowId-C<br>64-bit FlowId-D<br>64-bit FlowId-E | • Prioritize Flow A – C<br>• Best-Effort Flows D & E |
| 64-bit random id | IPv4-Addr<br>IPv6-Addr<br>Device mac-address<br>Hostname | 24-bit id | 64-bit FlowId-A<br>64-bit FlowId-B<br>64-bit FlowId-C<br>64-bit FlowId-D<br>64-bit FlowId-E | • Mirror all flows to security analytic<br>• Forward DNS query to ISP DNS server<br>• Zero Count all packets to domain xyz |

FIG. 5

MANAGING NETWORK PACKET FLOWS BASED ON DEVICE INFORMATION

CROSS-REFERENCE TO RELATED APPLICATIONS

This application is a continuation of U.S. patent application Ser. No. 16/995,066, filed Aug. 17, 2020, now U.S. Pat. No. 11,463,281, issued Oct. 4, 2022, which is a continuation of U.S. patent application Ser. No. 16/265,562, filed Feb. 1, 2019, now U.S. Pat. No. 10,785,058, issued Sep. 22, 2020, the entireties of which are incorporated herein by reference.

BACKGROUND

Network service providers, including content service providers, Internet service providers, and the like, may provide a variety of services to end users, including content delivery and Internet access. In typical service provider network architectures, a hub, server, distribution center, central location, or the like operated by the network service provider communicates over a delivery network with gateways located at customer premises. End user devices at the customer premises can connect to a local area network or the like behind the gateway and may then connect to the service provider network via the gateway to obtain services, such as Internet access, streaming media services, and the like.

Each communication session that an end user device initiates with a destination on the service provider network or a network, such as the Internet, that the end device accesses via the service provider network, results in transmission of a sequence of data packets, such as a sequence of Internet Protocol (IP) packets. Each such sequence of data packets may be referred to as a packet flow. For example, one packet flow might be associated with streaming content that a user device receives from a streaming media service, while another packet flow might be associated with a communication session that the user device has initiated with a financial services website.

It can be helpful to a network service provider to be able to analyze packet flows in the service provider network for a host of applications, including security and threat detection, bandwidth management and allocation, and network utilization, among others. Presently, there are impediments to performing fine-grained analysis of packet flows, because the network service provider can only assess packet flow between its hub and the gateways at various customer premises. Also, the service provider may be unable to analyze end-to-end packet flows on a user device basis. Thus, there is a need for methods and apparatus that may provide more fine-grained information about user devices behind a gateway.

SUMMARY

Methods and apparatus are disclosed herein that enable information about devices connected behind a gateway, such as a home gateway, to be made available to other entities, such as servers and routers, on a communications network.

A gateway of a communications network may establish or accept a connection to a device. The home gateway may create a profile for the device, wherein the profile comprises information associated with the device, and wherein the information comprises at least an identifier associated with the device. The gateway may receive from the device one or more packets of a packet flow initiated by the device. The gateway may append, to one or more of the packets of the packet flow, at least a portion of the information of the profile for the device. The gateway may then forward, to a server, router, or other node of the communications network, the one or more packets of the packet flow with the appended information of the profile for the device.

A server, router, or other entity or apparatus of a service provider network may receive, from a gateway of the communications network, one or more packets of a packet flow associated with a device connected to the gateway, wherein information maintained by the gateway in a profile for the device is appended to the one or more packets of the packet flow, and wherein the information comprises at least an identifier associated with the device. The appended information may be extracted from the one or more packets of the received packet flow and stored in association with an identifier associated with the received packet flow. The packet flow identifier may be part of the device profile information. The extracted device profile information may be used to enforce one or more policies on the device or on individual packet flows received from the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 5 is an example data structure that may be created and maintained based on device profile information extracted from received packet flows;

DETAILED DESCRIPTION OF ILLUSTRATIVE EMBODIMENTS

Methods and apparatus are disclosed that enable information about devices connected behind a gateway, such as a home gateway, to be made available to other entities, such as servers and routers, on a communications network.

Figure 1:
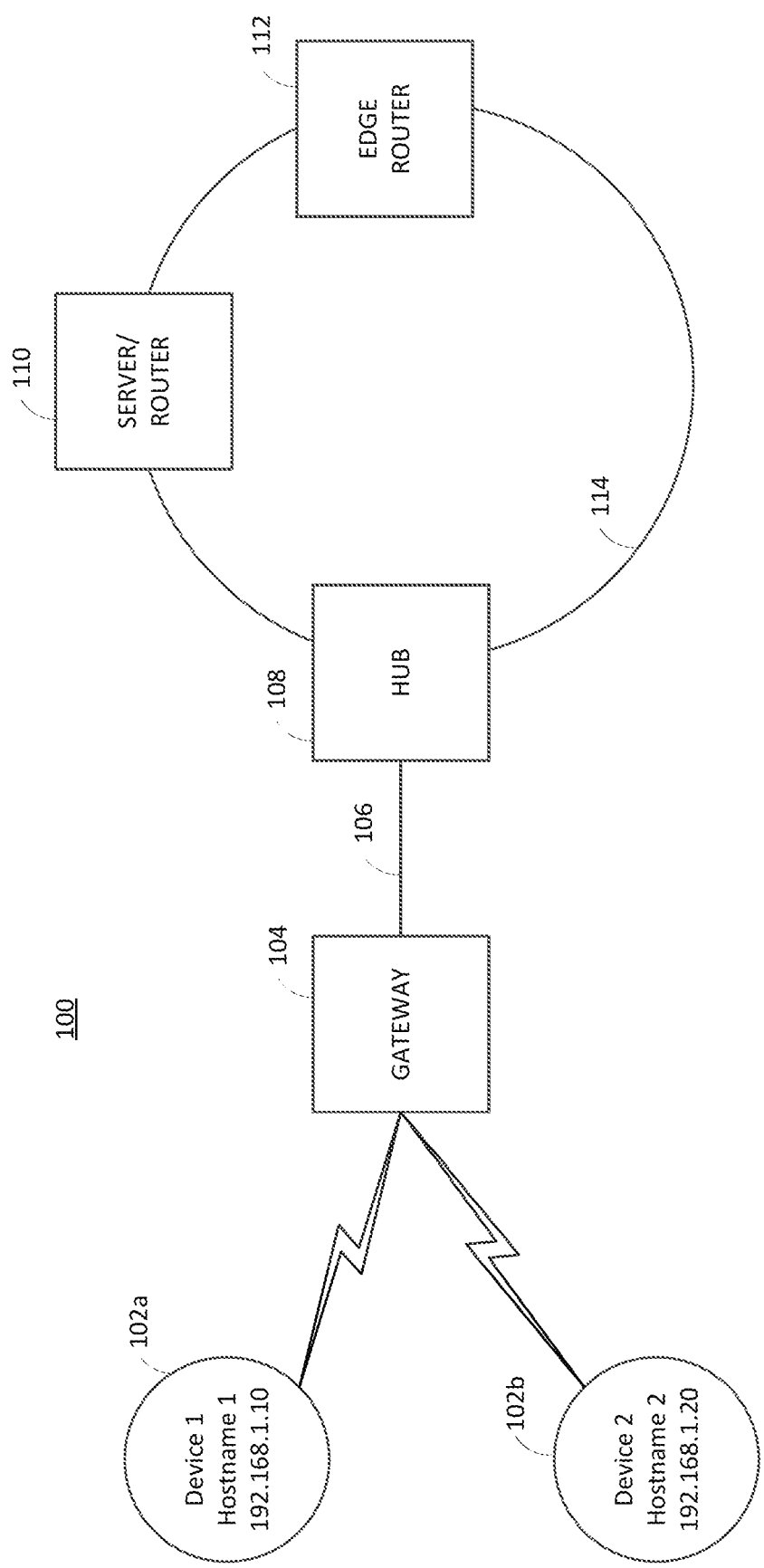
FIG. 1 is a diagram illustrating an example communications network.

FIG. 1 is a diagram illustrating an example communications network 100 in which the methods and apparatus described herein may be employed. The communications network 100 may comprise any communications network that supports Internet Protocol (IP) connectivity, including IPv4, IPv6, etc.

The communications network 100 of FIG. 1 may provide communication services to a plurality of subscribers. Each subscriber may have a gateway 104, which may also be referred to as a home gateway. The gateway 104 may also sometimes be referred to as customer premises equipment (CPE). The gateway 104 may be in the form of a set-top box or the like, and the gateway 104 may include an embedded cable modem (not shown). Although only one gateway 104 is depicted in FIG. 1, it is understood that there may be many subscribers to the services of the communications network, each of which may have a similar gateway 104.

The gateway 104 may be configured to enable subscriber devices, such as devices 102a and 102b, to establish a wired or wireless connection to the gateway for purposes of communicating with the gateway and other network apparatuses beyond the gateway. The gateway 104 may be configured to establish a wired and/or wireless local area network to which the devices may connect. For purposes of communicating wirelessly, the gateway 104 may implement a wireless access technology, such as the IEEE 802.11 ("Wi-Fi") radio access technology. In other implementations, other radio access technologies may be employed, such as IEEE 802.16 or 802.20 ("WiMAX"), IEEE 802.15.4a ("Zigbee"), or 802.15.3c ("UWB"). For purposes of communicating with the gateway 104 via a wired connection, the gateway may be configured to implement a wired local area network technology, such as IEEE 802.3 ("Ethernet") or the like.

A device connected to the gateway 104, such as the devices 102a and 102b, may comprise any of a variety of different types of wireless devices, including for example, a smartphone, a tablet computer, a laptop computer, a notebook computer, a personal computer, a personal digital assistant (PDA), a user equipment (UE), a mobile station, a fixed or mobile subscriber unit, a pager, a wireless sensor, other consumer electronics, and the like.

As illustrated in FIG. 1, each device 102a, 102b may have a hostname associated with it, such as "Hostname 1". Each device may also have an Internet Protocol (IP) address associated with it, such as "192.168.1.10." The IP address may be assigned to the device by the gateway 104 when the device initiates either a wired or wireless connection to the gateway 104. The IP address may be assigned in accordance with a protocol, such as Dynamic Host Configuration Protocol (DHCP), or the like.

As further shown, the communications network 100 further comprises a communications hub, server, distribution center, central location, or the like 108. The hub 108 may be in communication with each subscriber gateway 104 via a communications medium 106. The communications medium 106 may take any of a variety of forms, including a coaxial cable network, a fiber-optic cable network, a hybrid fiber-coaxial (HFC) network, a satellite transmission channel, or the like. When part of a cable television system, the hub 108 may comprise a cable modem termination system (CMTS). The hub 108 enables devices, such as devices 102a and 102b, to communicate with a service provider Internet Protocol (IP) network 114 via their respective gateway 104.

The service provider Internet protocol (IP) network 114 provides various services to subscriber devices 102a, 102b, and includes the appropriate infrastructure for these services. As shown, the service provider network 114 may include one or more servers or routers, such as server/router 110. Such network servers/routers may comprise a Domain Name System (DNS) server, a dynamic host configuration protocol (DHCP) server, a voice over Internet protocol (VoIP) server, a network management server, or any other server or router needed to provide desired services to subscribers. The service provider network may also comprise one or more edge routers, such as edge router 112, which may provide connectivity to other networks, including the Internet, a telephone network, or the like.

Figure 2:
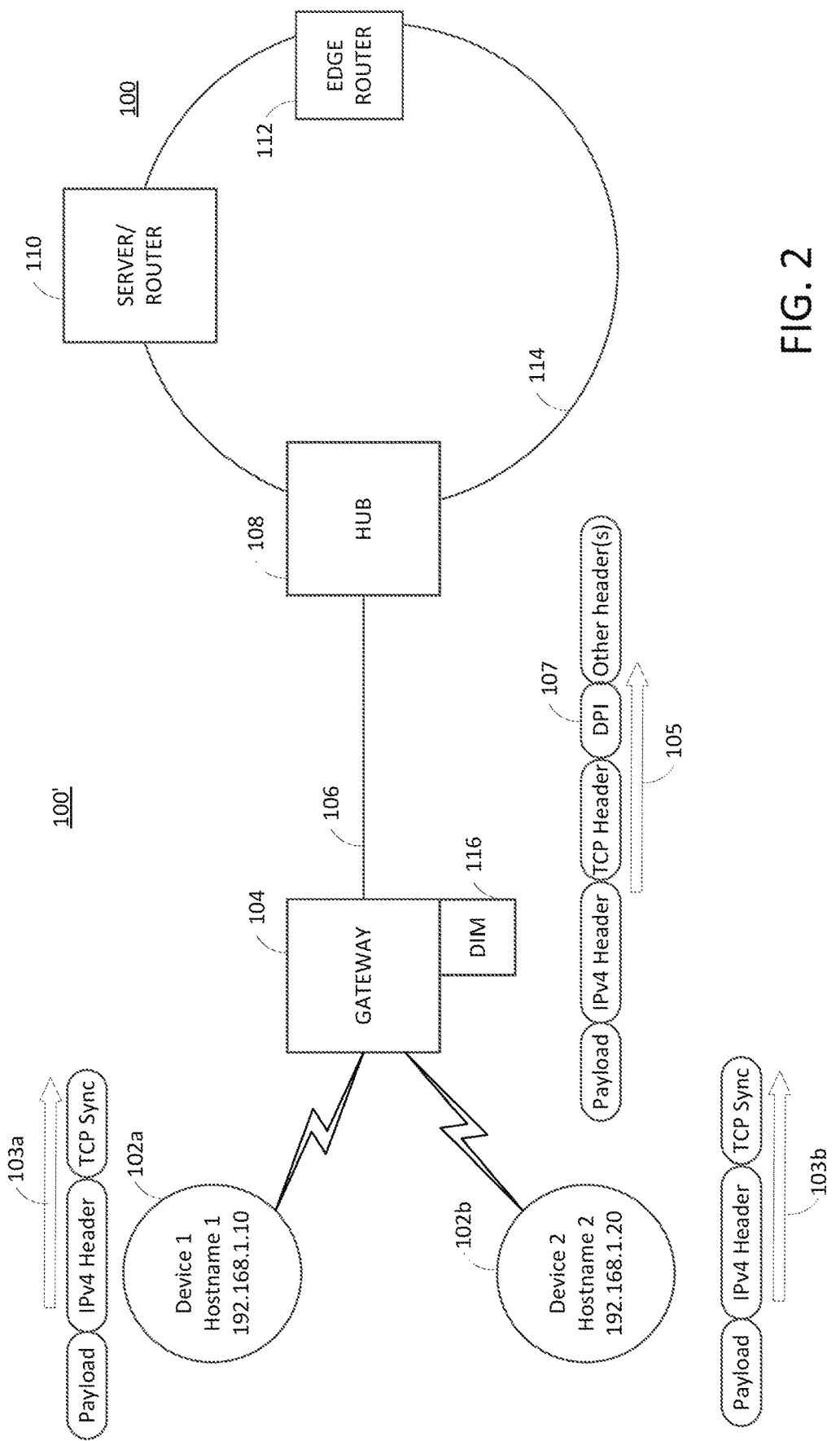
FIG. 2 is a diagram illustrating another example communications network and illustrating the initiation of packet flows from devices and the forwarding of such packet flows from a gateway to a hub, server, or router of a service provider network.

FIG. 2 is a diagram illustrating a communications network 100' in which the methods and apparatus described herein are employed. The communications network 100' is similar to the example communications network 100 of FIG. 1, but according to the methods and apparatus described herein, the gateway 104 further comprises a device information module (DIM) 116. As described hereinafter, the DIM 116 may create and maintain a profile for each device, such as devices 102a and 102b, that establish a connection to the gateway for purposes of accessing the service provider network 114.

The profile for a given device may comprise information associated with the device. The information may comprise any one or more of an identifier associated with the device, a media access control (MAC) address of the device, a hostname associated with the device, and an Internet Protocol (IP) address of the device. The DIM 116 may maintain the profile for each connected device in a memory (not shown) of the gateway 104.

As illustrated in FIG. 2, device 102a may initiate a packet flow 103a. Similarly, device 102b may initiate a packet flow 103b. Each packet flow may represent a communication session that the device 102a, 102b initiates with a destination on the service provider network 114 or a network, such as the Internet, that the device accesses via the service provider network 114. For example, one packet flow may be associated with streaming content that a user device receives from a streaming media service, while another packet flow may be associated with a communication session that the user device has initiated with a financial services website on the Internet. Each packet flow may comprise a sequence of data packets, such as a sequence of Internet Protocol (IP) packets. Further according to the methods and apparatus disclosed herein, when a device initiates a packet flow with the service provider network 114 via the gateway 104, the profile information stored by the DIM for the device may further comprise an identifier associated with the packet flow. The profile information may also include other information, such as a Hypertext Transfer Protocol (HTTP) header of at least one packet of the packet flow, or an indication of a most frequent Domain Name System (DNS) query issued by the device. Other information related to the device or a packet flow initiated by the device may also be included in the device profile.

As further illustrated in FIG. 2, a first packet of a newly initiated packet flow typically comprises a Transmission Control Protocol synchronization (TCP/SYN) packet. The TCP SYN packet is sent to indicate that a new communication session is to be established with the intended destination of the packet flow. A TCP SYN packet may include a Network Service Header (NSH) containing metadata. The metadata may be designated by a metadata (MD) type.

Further according to the methods and apparatus described herein, the DIM 116 of the gateway 104 may, upon receiving a new packet flow initiated by a device, such as device 102a or 102b, append to one or more of the packets of the packet flow, at least a portion of the information of the profile for the device. The gateway 104 may then forward, to the hub 108 of the communications network 114, the one or more packets of the packet flow with the appended information of the profile of the device. Such an appended packet flow is illustrated in FIG. 2 at 105. As shown, the device profile information 107 is embedded within the packet flow. The packets of the packet flow with the appended device profile information may be further wrapped in headers of other network protocols needed to transport the packet flow to the hub via the communications medium 106.

The portion of the information of the profile for the device may be appended to the packet flow by inserting it into a TCP SYN packet of the packet flow. The information may be inserted into a Network Service Header of the TCP SYN packet. Alternatively, the profile information may be inserted into a different portion of the TCP SYN packet. When inserted into the Network Service Header of the TCP SYN packet, the profile information may be designated as having metadata (MD) type=0x2. Alternatively, the profile information may be designated as having a different MD type. Still further, the profile information may be appended to, or inserted into, one or more different packets of the packet flow. All variations are contemplated herein.

In the event that the profile for a device is updated with new or modified information, the DIM 116 of the gateway 104 may append at least a portion of the updated information to subsequent packets in the packet flow in order to provide the updated information to the service provider network 114.

Figure 3:
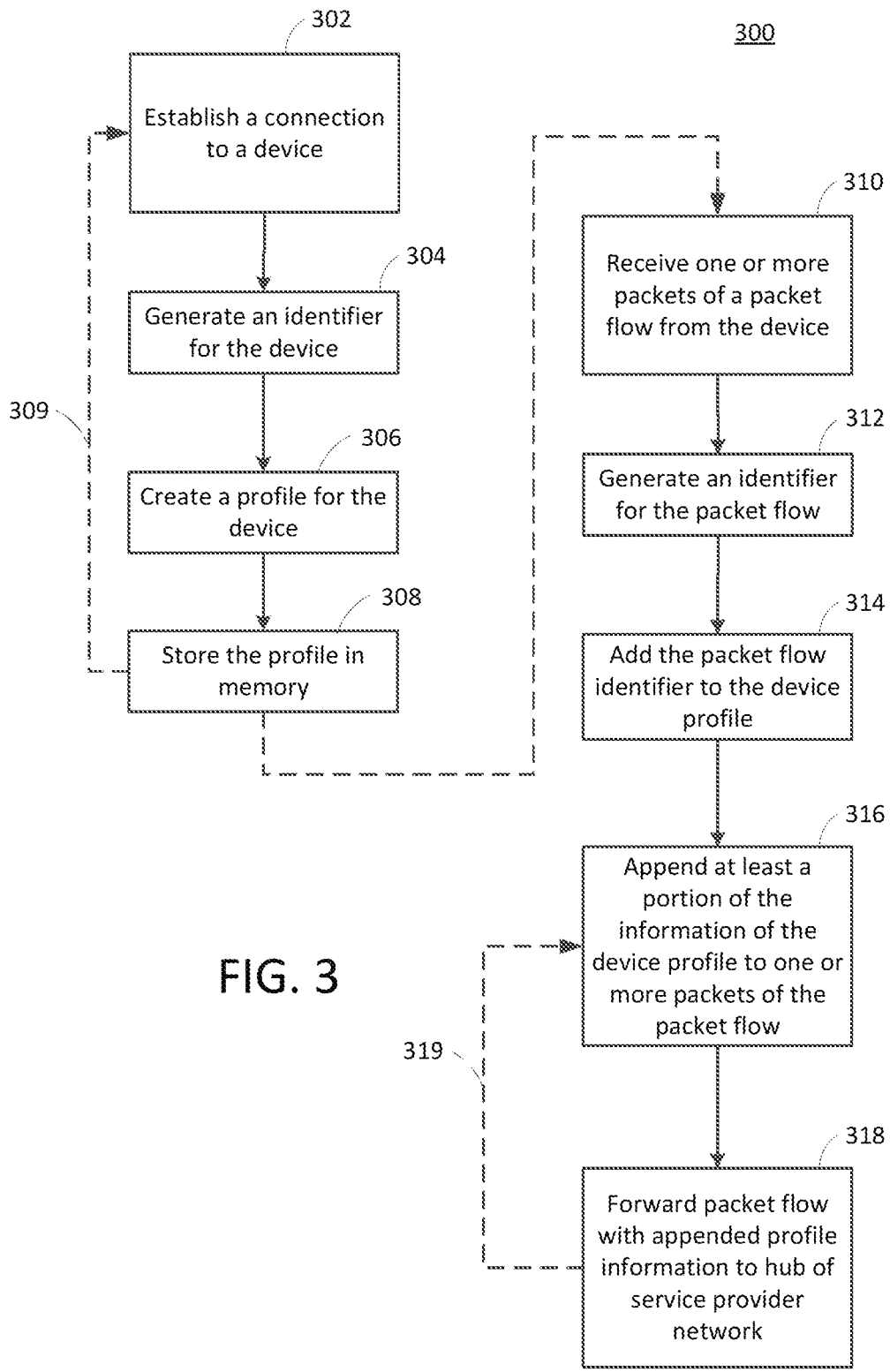
FIG. 3 is a flow chart of a method for enabling information about devices connected behind a gateway to be made available to other entities of a service provider network.

FIG. 3 is a flow chart of a method 300 for enabling information about devices connected behind a gateway, such as gateway 104, to be made available to other entities, such as servers and routers, on a communications network. The method of FIG. 3 may be performed by the gateway 104 and/or the DIM 116 of the gateway 104.

As shown, in step 302, the gateway 104 may establish a connection to a device. The connection may be a wired or a wireless connection. The connection may be established in accordance with a communications protocol implemented by the gateway 104 and the device. In the case of a wireless connection, the connection may be established in accordance with a wireless access technology, such as the IEEE 802.11 ("Wi-Fi") radio access technology. In other implementations, other radio access technologies may be employed, such as IEEE 802.16 or 802.20 ("WiMAX"), IEEE 802.15.4a ("Zigbee"), or 802.15.3c ("UWB"). In the case of a wired connection, the connection may be established in accordance with a protocol for wired communications, such as a wired local area network protocol. For example, the connection may be established in accordance with the IEEE 802.3 ("Ethernet") protocol, or the like. In other implementations, other wired and/or wireless protocols may be employed.

In step 304, the gateway 104 may generate an identifier for the device, which may be unique among all devices connected to the gateway 104. The identifier may be derived from other information about the device. For example, the device identifier may be derived from the Media Access Control (MAC) address of the device. Alternatively, the device identifier may be derived from the hostname of the device. As yet another alternative, the device identifier may be derived from a combination of the MAC address and hostname of the device. In one implementation, the device identifier may comprise 64 bits. In other implementations, the device identifier may be shorter or longer. The device identifier may be unique within a domain of the service provider network 114.

In step 306, the gateway 104 may create a profile for the device to store information about the device. The profile may be implemented as an entry in any suitable data structure, such as a table, an array, a matrix, a record of a database, or the like. The profile may comprise a variety of information associated with the device. The information may comprise any one or more of the device identifier generated in step 304, the media access control (MAC) address of the device, the hostname associated with the device, and an Internet Protocol (IP) address of the device. In step 308, the gateway 104 may store the profile in a memory of the gateway, using any suitable data structure, such as the data structures mentioned above.

As illustrated by the line 309 in FIG. 3, steps 302-308 may be repeated for each other device that establishes a wireless or wired connection to the gateway 104. The gateway 104 and/or DIM 116 may thus maintain profiles for each device connected to the gateway 104.

As described above, any device for which a device profile has been created, such as the devices 102a or 102b illustrated in FIG. 2, may initiate a packet flow via the gateway 104. Each packet flow may represent a communication session that a device initiates with a destination on the service provider network 114 or a network, such as the Internet, that the device accesses via the service provider network 114. For example, one packet flow may be associated with streaming content that a user device receives from a streaming media service, while another packet flow might be associated with a communication session that the user device has initiated with a financial services website on the Internet. Packet flows may be initiated for myriad types of communication sessions. Each packet flow may comprise a sequence of data packets, such as a sequence of Internet Protocol (IP) packets.

With reference to step 310 of FIG. 3, and further according to the methods and apparatus disclosed herein, when a device initiates a packet flow with the service provider network 114, one or more packets of the packet flow may be received by the gateway 104.

In step 312, the gateway may generate a unique identifier for the packet flow. The packet flow identifier may be generated by any suitable mechanism. In one implementation, the flow identifier may be a random number generated, for example, by a random number generator or the like. In one implementation, the packet flow identifier may comprise 64 bits. In other implementations, the packet flow identifier may be shorter or longer. The packet flow identifier may be locally significant on the gateway 104.

In step 314, the packet flow identifier for the received packet flow may be added to the profile associated with the device that initiated the packet flow. In one implementation, the device profile may be of the form:

device-id; flow-id; mac-address; hostname, where "device-id" is the identifier associated with the device, "flow-id" is the identifier generated for the received packet flow, "mac-address" is the MAC address of the device, and "hostname" is the hostname, or label, assigned to the device by the gateway 104.

Other information about the packet flow, which may be obtained by sampling and/or extracting information from the packet flow, may also be added to the device profile. For example, the other information may comprise a Hypertext Transfer Protocol (HTTP) header extracted from at least one packet of the packet flow. As another example, the other information may comprise a source IP address associated with the packet flow. As yet another example, the gateway may monitor the packets of the packet flow, may determine a most frequent Domain Name System (DNS) query carried in the packet flow, and may insert into the device profile the fully qualified domain name (FQDN) of the target of that most frequent DNS query. All combinations and alternatives of such other information are contemplated herein.

In step 316, at least some of the information of the device profile may be appended to one or more packets of the packet flow. In one implementation, all information in the device profile may be appended. In other implementations, less than all of the information may be appended.

All or a portion of the device profile information may be appended to the packet flow by inserting it into a TCP SYN packet of the packet flow. In one implementation, the information may be inserted into a Network Service Header of the TCP SYN packet. Alternatively, the profile information may be inserted into a different portion of the TCP SYN packet. When inserted into the Network Service Header of the TCP SYN packet, the profile information may be designated as having metadata (MD) type=0x2. Alternatively, the profile information may be designated as having a different MD type. Still further, the profile information may be appended to, or inserted into, one or more other packets of the packet flow. For example, the device profile information may be appended to, or inserted into, random packets of the packet flow. All variations are contemplated herein.

In step 318, the one or more packets of the packet flow with the appended device profile information may be forwarded to the hub 108 of the service provider network 108, per the communication protocol implemented by an operator of the communications network 100' for communications between the gateway 104 and hub 108.

As packets of the packet flow are received, at least some or all of the information in a device profile may be updated. As indicated by the dashed line 319 in FIG. 3, in the event that the profile for a device is updated with new or modified information, all or some of the information in the updated or modified device profile may be appended to subsequent packets in the packet flow in order to provide the updated or modified information to the service provider network 114.

Figure 4:
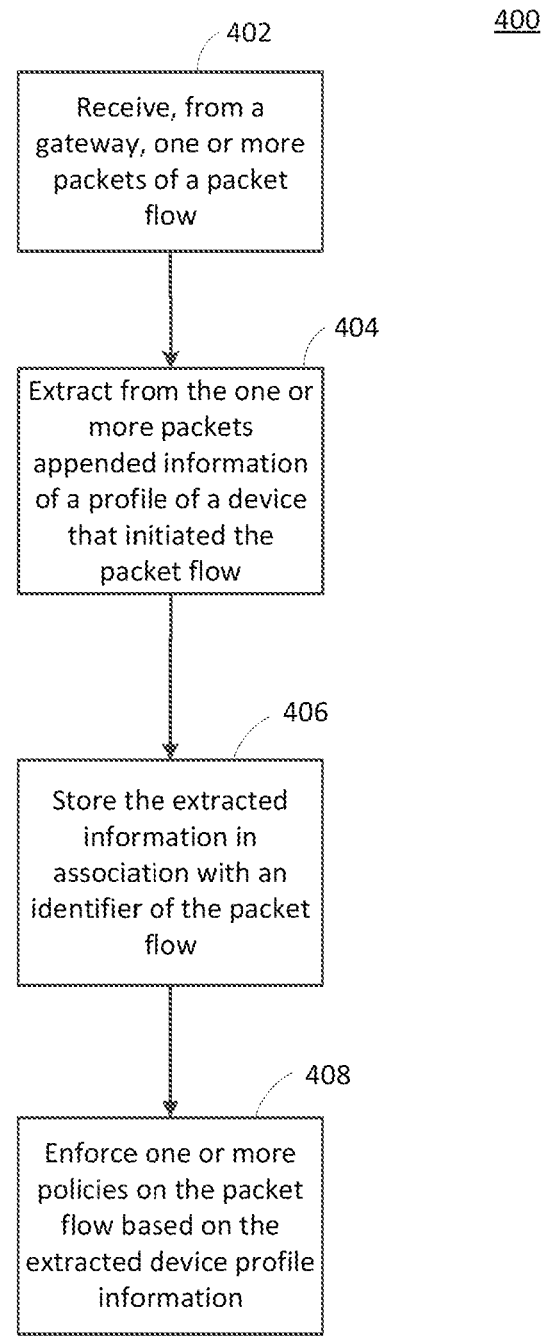
FIG. 4 is a flow diagram illustrating a method of extracting information appended to one or more packets of a received packet flow.

FIG. 4 is a flow diagram illustrating a method 400 for extracting device profile information appended to one or more packets of a received packet flow and for processing the same. The method of FIG. 4 may be performed by an entity or apparatus of the service provider network, such as the hub 108, a server or router 110, an edge router 112, or the like. The extracted device profile information may be employed to facilitate the application of one or more policies to aspects of a packet flow, the communication session that it represents, or the device from which the packet flow is received.

As shown in FIG. 4, at step 402, one or more packets of a packet flow may be received from a gateway of a communications network, such as the communications network 100' of FIG. 2. The one or more packets may have been received by a communications hub, server, distribution center, central location, or the like, such as the hub 108, of the communications network and forwarded to a server or router of a service provider network, such as the server or router 110 of the service provider network 114.

At step 404, information of a device profile associated with the device that initiated the packet flow may be extracted from the one or more packets of the packet flow. The device profile information may have been appended to the one or more packets of the packet flow in accordance with the method 300 of FIG. 3. In such case, the device profile information may be extracted from a TCP SYN packet of the packet flow. In one implementation, the information may be extracted from a Network Service Header of the TCP SYN packet. Alternatively, the profile information may be extracted from other portions of the TCP SYN packet. When extracted from the Network Service Header of the TCP SYN packet, the profile information may be designated as having metadata (MD) type=0x2. Alternatively, the profile information may be designated as having a different MD type. Still further, the profile information may be extracted from one or more other packets of the packet flow. For example, the device profile information may be extracted from random packets of the packet flow. All variations are contemplated herein.

The entity or apparatus that receives the one or more packets of the packet flow and that extracts the device profile information, such as the hub 108, may remove the extracted information from the received packet(s) before forwarding the packets of the packet flow on to the service provider network to prevent further dissemination of the extracted information on the service provider network or networks connected thereto, such as the Internet. For example, in an implementation in which the device profile information is contained in a Network Service Header of a TCP SYN packet, the hub 108 may remove the Network Service Header from the TCP SYN packet before forwarding the packet on to the service provider network.

At step 406, the extracted information may be stored in a memory in association with an identifier of the packet flow. The identifier of the packet flow may be part of the extracted device profile information.

At step 408, the extracted information may be employed to facilitate the enforcement of one or more policies on the packet flow. For example, the extracted information may be used to enforce a network policy on a per-device basis, such as a rate-limit policy, an application control policy, a web domain filter, or the like. As another example, the information may be used to enforce a device-based security policy of the network. Other uses of the extracted device profile information include device-based notification, such as threat detection, new device discovery, and usage threshold enforcement. With the ability to receive device profile information from devices connected behind a gateway in accordance with the methods and apparatus described above, a service provider network is able to perform more fine-grained analysis and management of packet flows on a per-device basis. Such policies may be applied or enforced by any entity or apparatus of the service provider network, such as the hub 108, a server or router 110, an edge router 112, or the like. The extracted information may also be employed to facilitate the provision of services to one or more devices. For example, for a given class or category of devices that do not self-identify themselves to the service provider network, the extracted profile information may be used to identify those devices and control the provision of one or more services to that class or category of device. For example, a certain category of devices, such as Internet of Things (IoT) sensors, may require very low bandwidth and low priority of traffic. Based on the profile information received for those devices, an entity of the service provider network could mark packet flows from those devices and deprioritize them in order to offer a very low cost IoT data service that otherwise would not impact overall network capacity.

The hub 108 may transmit a message back to the gateway (e.g. gateway 104) from which the packet flow was received to signal to the gateway to re-send the device profile information for validation purposes. In one implementations, such a signal to re-send the device profile information may comprise inserting a Network Service Header having an MD Type=0x2 in a TCP ACK packet transmitted back to the gateway. In other implementations, the signal may be transmitted in other suitable headers or packets transmitted back to the gateway.

FIG. 5 shows an example data structure 500 that may be created and maintained in the service provider network to hold device profile information that has been extracted from one or more packet flows received by the service provider network from a gateway, such as gateway 104 of FIG. 2. The data structure may be implemented using any suitable data structure, such as a table, an array, a matrix, a database, or the like. The data structure 500 may be created and maintained by an entity or apparatus of the service provider network, such as the hub 108, a server or router 110, an edge router 112, or the like, and the data structure may be stored in a memory of such entity or apparatus.

As shown, the data structure 500 may comprise one or more entries, such as entries 502a and 502b. Each entry may correspond to a device, such as the device 102a or 102b of FIGS. 1 and 2. Each entry may be created and maintained based on device profile information associated with the respective device, which device profile information may have been extracted from the packets of one or more packet flows received from the device. For example, the device profile information may have been extracted in accordance with the method illustrated in FIG. 4.

As further shown, each entry 502a, 502b of the data structure may comprise a first field 504 which holds an identifier associated with the device (e.g., "Device-ID"), a second field 506 that stores device profile information extracted from one or more packet flows received from the device ("Device Profile"), a third field 508 that stores an identifier associated with the gateway, such as gateway 104, from which the one or more packets flows of the device have been received ("Gateway ID"), a fourth field 550 that stores the identifiers of each of the one or more packets flows received from the device ("Existing Flows by Flow ID"), and a fifth field 512 that stores one or policies that may be enforced against the packet flows received from the device ("Policies").

The device identifier stored in the Device-ID field 504 may have been derived from other information about the device. For example, the device identifier may have been derived from the Media Access Control (MAC) address of the device. Alternatively, the device identifier may have been derived from the hostname of the device. As yet another alternative, the device identifier may have been derived from a combination of the MAC address and hostname of the device. In one implementation, the device identifier may comprise 64 bits. In other implementations, the device identifier may be shorter or longer.

The Device Profile field 506 of each entry of the data structure may store all or some of the device profile information that may have been extracted from the one or more packets of each packet flow received from the device. As shown in the example of FIG. 5, the device profile information may comprise one or more source IP addresses associated with the device (e.g., IPv4-Addr, IPv6-Addr), the MAC address of the device ("Device mac-address"), and the hostname associated with the device ("Hostname"). The device profile information may comprise other information about the device, such as the most frequent DNS queries from the device, information from an HTTP header of the one or more packets received from the device, or both.

The identifier of the gateway stored in the Gateway ID field 508 of each entry of the data structure may be a unique identifier assigned to the gateway to which the device is connected—and from which the packet flows are received by the hub of the service provider network. The gateway identifier may be unique within a domain of the service provider network. In one implementation, the gateway identifier may comprise 24 bits. In other implementations, the gateway identifier may comprise more or less bits.

The packet flow identifiers stored in the fourth field 510 of each entry of the data structure may have been generated by any suitable mechanism. In one implementation, each packet flow identifier may be a random number generated, for example, by a random number generator or the like within the gateway to which the respective device is connected. In one implementation, each packet flow identifier may comprise 64 bits. In other implementations, the packet flow identifier may be shorter or longer.

As described above, the Policies field 512 of each entry of the data structure may identify one or policies that may be enforced against the packet flows received from the device ("Policies"). Example policies may include per-device policies, such as a rate-limit policy, an application control policy, a web domain filter, a device-based security policy, or the like. In the entry 502a of the data structure 500 of FIG. 5, for example, a policy may be enforced that prioritizes packet flows A-C, while providing a best effort approach to packet flows D and E. As illustrated in the entry 502b of the data structure 500 of FIG. 5, other policies may include a policy to mirror all packet flows to a server or other network entity that may perform security analysis on each packet flow, a policy that controls to which Domain Name Server (DNS) of the service provider network DNS queries of a packet flow are forwarded, and a policy that causes packets to a particular domain not to be counted against a usage quota associated with a given service plan. Other policies may relate to device-based notification, threat detection and alerts, new device discovery, and usage threshold enforcement. As mentioned above, with the ability to receive device profile information from devices connected behind a gateway in accordance with the methods and apparatus described above, a service provider network is able to perform more fine-grained analysis and management of packet flows on a per-device basis and per-flow basis.

Figure 6:
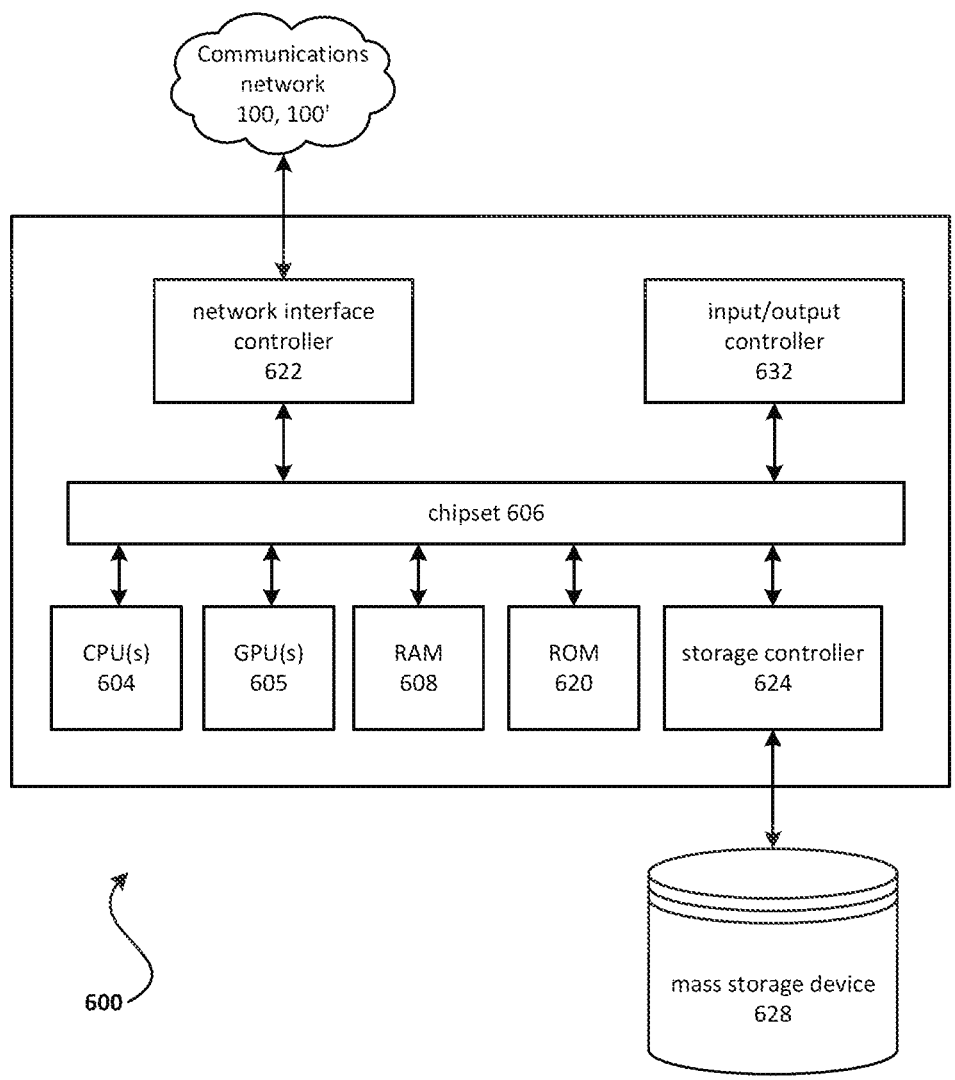
FIG. 6 is a block diagram of an example computing device.

FIG. 6 depicts an example computing device 600 that may represent any of the various devices or entities illustrated in FIGS. 1 and 2, including, for example, the devices 102a, 102b, the gateway 104 and DIM 116, the hub 108, the server/router 110, and the edge router 112. That is, the computing device 600 shown in FIG. 6 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or 2, or any of the methods described in relation to FIGS. 3 and 4.

The computing device 600 may include a baseboard, or "motherboard," which is a printed circuit board to which a multitude of components or devices may be connected by way of a system bus or other electrical communication paths. One or more central processing units (CPUs or "processors") 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems of the communications network 100, 100'. The chipset 606 may include functionality for providing network connectivity through a network interface controller (NIC) 622. A NIC 622 may be capable of connecting the computing device 600 to other computing nodes over the communications network 100, 100'. It should be appreciated that multiple NICs 622 may be present in the computing device 600, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the communications network 100, 100'. For example, the NIC 622 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 600 may be connected to a mass storage device 628 that provides non-volatile storage (i.e., memory) for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3 and 4.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing device may also include a virtual machine host process and one or more virtual machine instances. Computer-executable instructions may be executed by the physical hardware of a computing device indirectly through interpretation and/or execution of instructions stored and executed in the context of a virtual machine.

Figure 7:
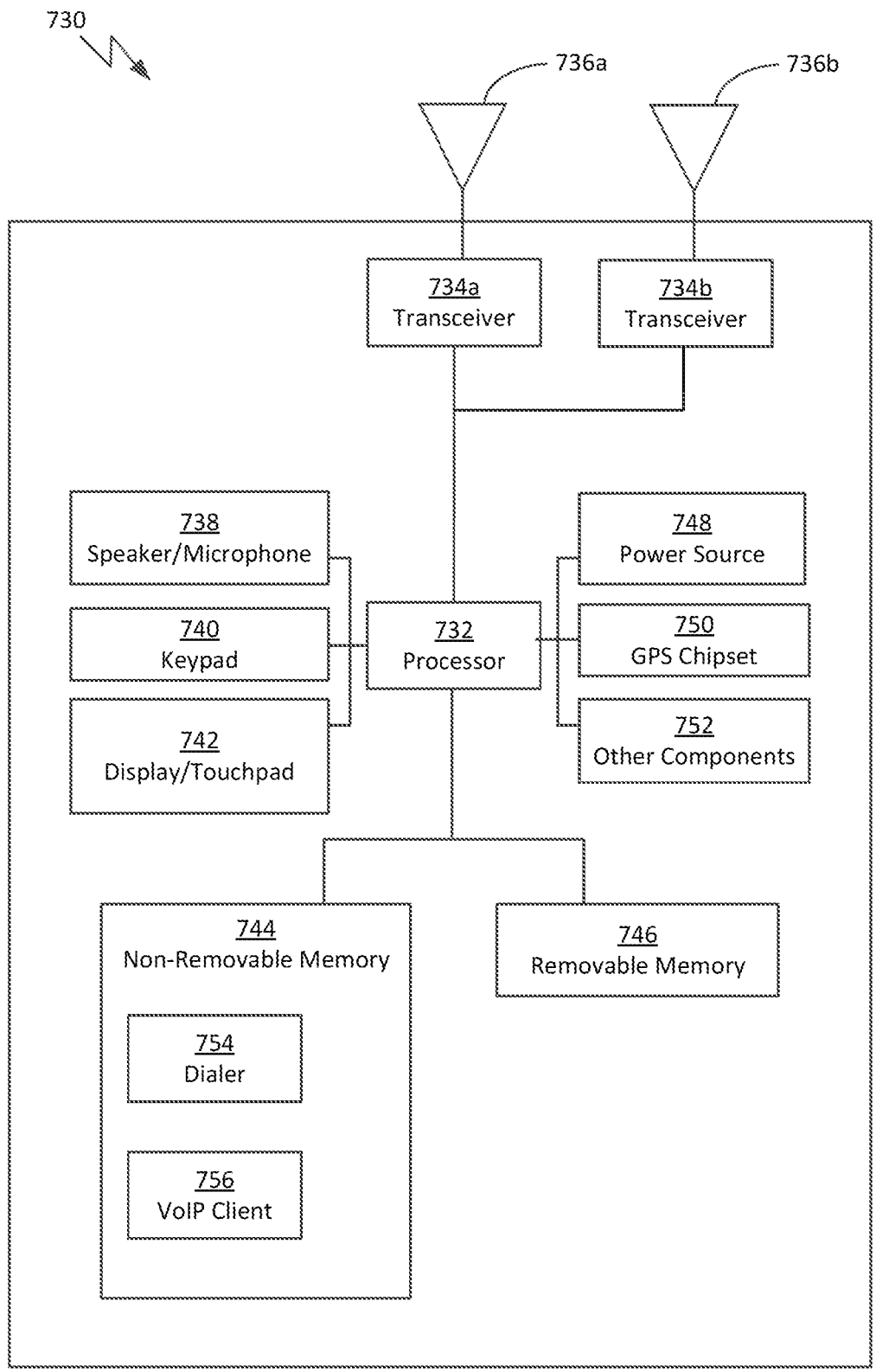
FIG. 7 is a block diagram of an example mobile device.

FIG. 7 is a block diagram illustrating an example architecture of a mobile device 730, such as may be representative of the devices 102a and 102b of FIGS. 1 and 2. The mobile device 730 may comprise any of a variety of different types of mobile devices, including for example, a smartphone, a tablet computer, a laptop computer, a notebook computer, a personal computer, a personal digital assistant (PDA), a user equipment (UE), a mobile station, a fixed or mobile subscriber unit, a pager, a wireless sensor, other consumer electronics, and the like.

As shown in FIG. 7, the mobile device 730 may include a processor 732, non-removable memory 744, removable memory 746, a speaker/microphone 738, a keypad 740, a display or touchpad 742, a power source 748, a global positioning system (GPS) chipset 750, and other components 752. The mobile device 730 may also include communication circuitry, such as one or more transceivers 734a, 734b and one or more antennas 736a, 736b.

The processor 732 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 732 may execute computer-executable instructions stored in the memory (e.g., memory 44 and/or memory 46) of the device in order to perform the various required functions of the device. For example, the processor 732 may perform signal coding, data processing, power control, input/output processing, and/or any other functionality that enables the mobile device 730 to operate in a wireless or wired environment. The processor 732 may run application programs, operating systems, communications programs, or other programs. The processor 732 may run a dialer application 754 to enable users to initiate and answer telephone calls or VoIP communications. The processor 732 may also run a VoIP Client to perform VoIP communications. These applications, programs, and clients may reside in and be retrieved for execution from a memory of the mobile device 730, such as the memory 744. The processor 732 may also perform security operations such as authentication, security key agreement, and cryptographic operations.

As shown in FIG. 7, the processor 732 may be coupled to its communication circuitry (e.g., transceivers 734a, 734b and antennas 736a, 736b). The processor 732, through the execution of computer executable instructions, may control the communication circuitry in order to cause the mobile device 730 to communicate with other elements of a network to which it is connected. For example, the communications circuitry may enable the device 730 to connect to a gateway, such as the gateway 104 of FIGS. 1 and 2. While FIG. 7 depicts the processor 732 and the transceivers 734a, 734b as separate components, it will be appreciated that the processor 732 and the transceivers 734a, 734b may be integrated together in an electronic package or chip.

The antennas 736a, 736b may be configured to transmit signals to, or receive signals from, other network elements, such as the gateway 104 of FIGS. 1 and 2. The transceivers 734a, 734b and antennas 736a, 736b may support various networks and air interfaces, such as Wi-Fi, WLAN, WPAN, cellular, and the like. In addition, although the antennas 736a, 736b are depicted in FIG. 7 as single elements, the mobile device 730 may include any number of antennas. For example, the mobile device 730 may employ MIMO technology. Thus, each of the illustrated antennas 736a, 736b may comprise multiple antennas for transmitting and receiving wireless signals.

Each transceiver 734a, 734b may be configured to modulate the signals that are to be transmitted by the antennas 736a, 736b and to demodulate the signals that are received by the antennas. Each transceiver 734a, 734b and its respective antenna 736a, 736b may implement a different radio access technology. For example, one of the transceivers may implement a cellular radio access technology, such as CDMA or LTE, while another of the transceivers may implement the IEEE 802.11 (Wi-Fi) radio access technology. Moreover, although the mobile device 730 is depicted as including two transceivers 734a, 734b and respective antennas 736a, 736b, it is understood that the mobile device 730 may comprise more or less transceivers and antennas.

The processor 732 may access information from, and store data in, any type of suitable memory, such as the non-removable memory 744 and/or the removable memory 746. For example, the processor 732 may store session context in its memory, as described above. The non-removable memory 744 may include random-access memory (RAM), read-only memory (ROM), a hard disk, or any other type of memory storage device. The removable memory 746 may include a subscriber identity module (SIM) card, a memory stick, a secure digital (SD) memory card, and the like. In other embodiments, the processor 732 may access information from, and store data in, memory that is not physically located on the mobile device 730, such as on a server or a computer.

The processor 732 may receive power from the power source 748, and may be configured to distribute and/or control the power to the other components in the mobile device 730. The power source 748 may be any suitable device for powering the mobile device 730. For example, the power source 748 may include one or more dry cell batteries (e.g., nickel-cadmium (NiCad), nickel-zinc (NiZn), nickel metal hydride (NiMH), lithium-ion (Li-ion), etc.), solar cells, fuel cells, and the like.

The processor 732 may also be coupled to the GPS chipset 750, which is configured to provide location information (e.g., longitude and latitude) regarding the current location of the mobile device 730. It will be appreciated that the mobile device 730 may acquire location information by way of any suitable location-determination method.

The processor 732 may further be coupled to other components 752, which may include one or more software or hardware modules that provide additional features or functionality. For example, the peripherals 752 may include various sensors, a camera, or the like.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method, comprising:
   receiving, by a gateway of a communications network, from a device configured to communicate with the gateway, one or more packets of a packet flow initiated by the device;
   appending, to one or more of the packets of the packet flow, at least a portion of information associated with the device, wherein the information associated with the device is maintained by the gateway and comprises at least an identifier associated with the device; and
   sending, by the gateway, to a network device of the communications network, the one or more packets of the packet flow with the appended information, wherein the appended information facilitates enforcement of a per-device policy.

2. The method of claim 1, wherein the information associated with the device further comprises one or more of a media access control (MAC) address of the device, a hostname associated with the device, and an identifier associated with the packet flow received from the device.

3. The method of claim 1, wherein the information associated with the device further comprises a Hypertext Transfer Protocol (HTTP) header of at least one of the packets of the packet flow.

4. The method of claim 1, wherein the information associated with the device further comprises a source IP address associated with the packet flow.

5. The method of claim 1, wherein the appending comprises inserting the at least a portion of the information in a Transmission Control Protocol synchronization (TCP/SYN) packet of the packet flow.

6. The method of claim 5, wherein inserting the at least a portion of the information in the TCP/SYN packet comprises inserting the at least a portion of the information in a Network Service Header (NSH) of the TCP/SYN packet.

7. The method of claim 1, wherein the per-device policy comprises a rate-limit policy, an application control policy, a web domain filter, or a combination thereof.

8. A system comprising:
   a device;
   a network device; and
   a gateway configured to communicate with the device and the network device, wherein the gateway is configured to:
      receive, from the device, one or more packets of a packet flow initiated by the device;
      append, to one or more of the packets of the packet flow, at least a portion of information associated with the device, wherein the information associated with the device is maintained by the gateway and comprises at least an identifier associated with the device; and
      send, to the network device, the one or more packets of the packet flow with the appended information, wherein the appended information facilitates enforcement of a per-device policy.

9. The system of claim 8, wherein the information associated with the device further comprises one or more of a media access control (MAC) address of the device, a hostname associated with the device, and an identifier associated with the packet flow received from the device.

10. The system of claim 8, wherein the information associated with the device further comprises a Hypertext Transfer Protocol (HTTP) header of at least one of the packets of the packet flow.

11. The system of claim 8, wherein the information associated with the device further comprises a source IP address associated with the packet flow.

12. The system of claim 8, wherein the appending comprises inserting the at least a portion of the information in a Transmission Control Protocol synchronization (TCP/SYN) packet of the packet flow.

13. The system of claim 12, wherein inserting the at least a portion of the information in the TCP/SYN packet comprises inserting the at least a portion of the information in a Network Service Header (NSH) of the TCP/SYN packet.

14. The system of claim 8, wherein the per-device policy comprises a rate-limit policy, an application control policy, a web domain filter, or a combination thereof.

15. A gateway, comprising:
   a processor; and
   memory storing computer-executable instructions that, when executed by the processor, cause the gateway to:

receive, from a device configured to communicate with the gateway, one or more packets of a packet flow initiated by the device;

append, to one or more of the packets of the packet flow, at least a portion of information associated with the device, wherein the information associated with the device is maintained by the gateway and comprises at least an identifier associated with the device; and send, to a network device of a communications network, the one or more packets of the packet flow with the appended information, wherein the appended information facilitates enforcement of a per-device policy.

16. The gateway of claim 15, wherein the information associated with the device further comprises one or more of a media access control (MAC) address of the device, a hostname associated with the device, and an identifier associated with the packet flow received from the device.

17. The gateway of claim 15, wherein the information associated with the device further comprises a Hypertext Transfer Protocol (HTTP) header of at least one of the packets of the packet flow.

18. The gateway of claim 15, wherein the information associated with the device further comprises a source IP address associated with the packet flow.

19. The gateway of claim 15, wherein the appending comprises inserting the at least a portion of the information in a Transmission Control Protocol synchronization (TCP/SYN) packet of the packet flow.

20. The gateway of claim 15, wherein the per-device policy comprises a rate-limit policy, an application control policy, a web domain filter, or a combination thereof.

21. A non-transitory, computer-readable medium comprising computer-executable instructions that, when executed by a processor, cause:

receiving, by a gateway of a communications network, from a device configured to communicate with the gateway, one or more packets of a packet flow initiated by the device;

appending, to one or more of the packets of the packet flow, at least a portion of information associated with the device, wherein the information associated with the device is maintained by the gateway and comprises at least an identifier associated with the device; and sending, by the gateway, to a network device of the communications network, the one or more packets of the packet flow with the appended information, wherein the appended information facilitates enforcement of a per-device policy.

22. The non-transitory, computer-readable medium of claim 21, wherein the information associated with the device further comprises one or more of a media access control (MAC) address of the device, a hostname associated with the device, and an identifier associated with the packet flow received from the device.

23. The non-transitory, computer-readable medium of claim 21, wherein the information associated with the device further comprises a Hypertext Transfer Protocol (HTTP) header of at least one of the packets of the packet flow.

24. The non-transitory, computer-readable medium of claim 21, wherein the information associated with the device further comprises a source IP address associated with the packet flow.

25. The non-transitory, computer-readable medium of claim 21, wherein the appending comprises inserting the at least a portion of the information in a Transmission Control Protocol synchronization (TCP/SYN) packet of the packet flow.

26. The non-transitory, computer-readable medium of claim 25, wherein inserting the at least a portion of the information in the TCP/SYN packet comprises inserting the at least a portion of the information in a Network Service Header (NSH) of the TCP/SYN packet.

27. The non-transitory, computer-readable medium of claim 21, wherein the per-device policy comprises a rate-limit policy, an application control policy, a web domain filter, or a combination thereof.

\* \* \* \* \*